United States Patent [19]
Moyer et al.

[11] Patent Number: 4,875,813
[45] Date of Patent: Oct. 24, 1989

[54] WHEEL CHOCK

[76] Inventors: Donald L. Moyer, 5753 N. 80th St., Omaha, Nebr. 68134; Thomas O. Allred, 10311 Adams St., Omaha, Nebr. 68127

[21] Appl. No.: 280,350

[22] Filed: Dec. 6, 1988

[51] Int. Cl.⁴ .......................... B61D 3/18; B60P 3/07
[52] U.S. Cl. ........................................... 410/9; 410/10; 410/20; 410/30
[58] Field of Search ............... 410/3, 4, 7, 8, 9, 10, 410/26, 30; 188/32, 36

[56] References Cited

U.S. PATENT DOCUMENTS

| Re. 19,337 | 10/1984 | Butterworth. |
| 770,510 | 9/1904 | Stulken. |
| 833,454 | 10/1906 | Flemming. |
| 1,333,144 | 3/1920 | Wilcox. |
| 1,498,087 | 6/1924 | Fowler. |
| 1,669,578 | 5/1928 | Scherer. |
| 1,776,935 | 9/1930 | Synder. |
| 1,778,162 | 10/1930 | Mills et al. |
| 1,846,750 | 2/1932 | Patterson. |
| 1,906,022 | 4/1933 | Tobin. |
| 1,937,769 | 12/1933 | Lute. |
| 1,990,562 | 2/1935 | Otis. |
| 2,000,306 | 5/1935 | Tobin. |
| 2,023,971 | 12/1935 | Otis. |
| 2,028,574 | 1/1936 | Tobin et al. |
| 2,046,855 | 7/1936 | Tobin. |
| 2,079,992 | 5/1937 | Gonzalez. |
| 2,655,874 | 10/1933 | Swann. |
| 2,675,265 | 4/1954 | Meighan et al. |
| 2,685,849 | 8/1954 | Meighan et al. |
| 2,771,162 | 11/1956 | Marsh. |
| 2,802,429 | 8/1957 | Storch. |
| 3,070,042 | 12/1962 | Dunlap. |
| 3,181,886 | 5/1965 | Blunden et al. |
| 3,187,686 | 6/1965 | De Podesta. |
| 3,298,324 | 1/1967 | Schwiebert. |
| 3,566,803 | 3/1971 | Blunden et al. |
| 3,782,295 | 1/1974 | Balinksi. |
| 3,841,235 | 10/1974 | Wheeler et al. |
| 3,842,754 | 10/1974 | Jones. |
| 3,888,191 | 6/1975 | Jones. |
| 4,044,691 | 8/1977 | Kilgus et al. |
| 4,147,113 | 4/1979 | Kilgus et al. |
| 4,343,401 | 8/1982 | Paulyson. |
| 4,668,140 | 5/1987 | Blunden. |
| 4,674,929 | 6/1987 | Blunden. |
| 4,679,974 | 7/1987 | Blunden. |
| 4,836,726 | 6/1989 | Robertson et al. ............. 410/9 |

FOREIGN PATENT DOCUMENTS 1469877  2/1967  France.

Primary Examiner—Andres Kashnikow
Assistant Examiner—Virna Lissi Mojica
Attorney, Agent, or Firm—Robert A. Ostmann

[57] ABSTRACT

A wheel chock for restraining motor vehicles during transport comprises a monolithic body defined by a synthetic plastic molding or an aluminum casting and provided with a pair of locking pins and a latching mechanism for releasably securing it to a mounting rail fixed on a deck of the vehicle transporter. The chock also incorporates a reeling mechanism, including a pawl and ratchet locking device, for holding and tensioning an over-the-wheel safety harness.

23 Claims, 3 Drawing Sheets

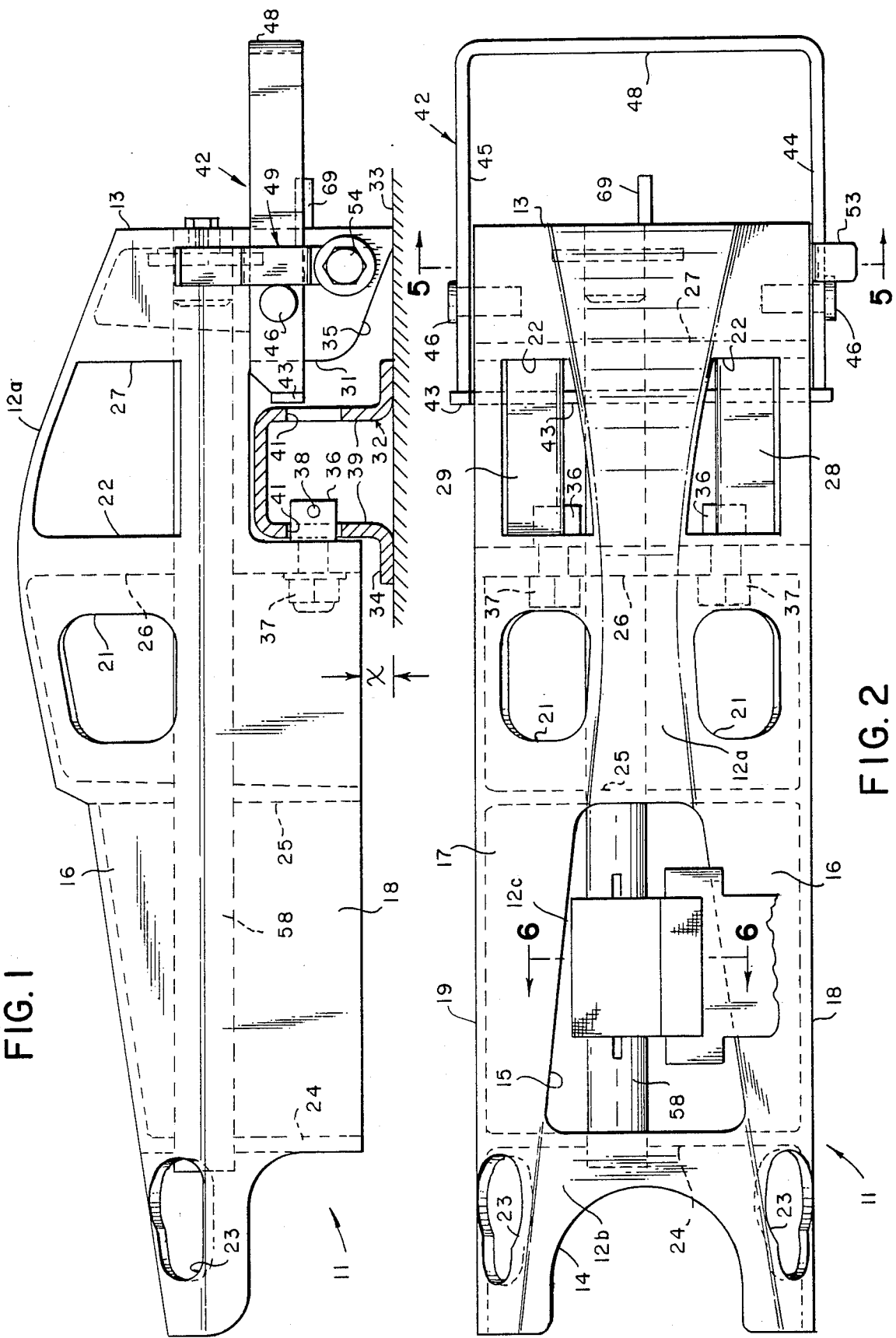

WHEEL CHOCK

BACKGROUND OF THE INVENTION

This invention concerns wheel chocks used to secure motor vehicles on the decks of transporters, especially railway cars.

Most motor vehicles, such as automobiles, are moved between assembly and distribution sites by rail transport. Since railway cars are subjected to substantial impact loads and vibrations, it is essential that the carried vehicles be securely held in place on the decks of the cars during transit. For many years, the conventional holding scheme employed tie down chains which interconnected the vehicle body and the structure of the rail car and which were tightened to compress the suspension springs of the vehicle. Lately, however, increasing attention has been given to restraint schemes employing wheel chocks. Considerable study and research conducted by the railroad and automotive industries has revealed that four chocks, positioned fore and aft of each wheel on one side of a vehicle, afford adequate restraint under usual loading conditions, and that protection against dislodgment under abnormal loads can be provided by equipping each set of chocks with an over-the-wheel harness. The investigators have also considered the practical matter of design compatibility, for it is recognized that car interchange is an integral part of railroad life in America. As a result of this activity, it has been decided that all chocks must be adapted for releasable attachment to a prescribed mounting rail of hat shape in cross section which extends lengthwise of the car and each of whose upright walls contains a uniform pattern of locking holes. The design of the chock itself has not been, and may never be, standardized, and a variety of proposals have been made. However, at least as far as we are aware, none of the various designs has proven entirely satisfactory.

SUMMARY OF THE INVENTION

The object of this invention is to provide a practical wheel chock for use in association with a standard mounting rail of the kind mentioned above which eliminates major disadvantages of prior designs and which, we believe, satisfies well all of the essential requirements for this type of apparatus. The main component of the new chock is a monolithic body defined by an aluminum casting or a synthetic plastic molding. This type of construction is sturdy, yet lightweight, so it can satisfy structural requirements and at the same time make use of the chock less tiring to the workers who load and unload the motor vehicles. Moreover, since the dimensions of a cast or molded body may be easily controlled and selected to take full account of the manufacturing tolerances applicable to the mounting rail, a good and proper fit of the chock on the rail is guaranteed.

The chock body is an elongated, open bottom structure having a central ridge wall flanked by a pair of symmetrical downward and outward sloping wheel-engaging side wall portions. This gives the chock a universal character, i.e., it may be used either in front of or behind a vehicle wheel.

The new chock is held in place on the rail by a unique locking and latching arrangement. According to this aspect of the invention, the chock body is formed with a rail-receiving recess bounded by a wall from which protrude a pair of locking pins adopted to engage alternate holes in one of the upright rail walls. The recess affords an unobstructed space slightly wider than the rail, so the chock can be placed on the rail from above and then shifted laterally to effect engagement of the pins in the holes. The chock may tilt in both horizontal and vertical planes during service, but the range of such motion is limited by the margins of the recess so that at least one of the pins always remains engaged in the associated rail hole. This feature is important because it assures that the chock will be effective to restrain the motor vehicle even though the workers inadvertently fail to latch it to the rail. Normally, however, latching is recommended. Therefore, the chock includes a manually operated latching member. This member is mounted on the body for movement between a latching position, wherein it is deposed in the recess along one upright wall of the rail and coacts with the bounding recess wall to capture the rail sufficiently to prevent lateral withdrawal of the pins from the associated rail holes, and an unlatching position, in which it permits such withdrawal. The latching member is equipped with a manually releasable locking element which is effective automatically upon movement of the latching member to latching position to positively hold the member in that position. The locking element, and a manual actuator for the latching member, are accessible at the outboard end of the chock. Therefore, mounting and dismounting of the chock can be effected easily and without the necessity for a worker to reach beneath the motor vehicle.

Since use of an over-the-wheel safety harness usually is desired, the preferred chock incorporates a reeling shaft on which an end strap of such a harness is wound, and which is provided with a pawl and ratchet locking mechanism for holding the harness in taut condition. One end of the shaft is exposed at the outboard end of the chock body, and the pawl has a manually operated release element which also projects through that body end. Thus, these parts are readily accessible for easy and safe manipulation. However, the exposed pawl release element could be damaged or inadvertently actuated by a careless workman, so it is desirable to provide it with a guard. In the preferred embodiment, this guarding function is performed by the manual actuator of the latching member.

The reeling shaft extends longitudinally through the chock body in a central region thereof, and the portion of the shaft which receives the harness strap underlies a relatively large window opening in the ridge wall of the body. The shaft, however, is displaced from the center of the body, the eccentricity being such that the strap is positioned approximately in the center of the body in the region where it passes onto the shaft. This arrangement keeps the harness close to the vehicle's wheel, thus reducing the risk of contact between the strap and the vehicle body, and also minimizes the risk that the strap will rub against the margins of the window opening.

BRIEF DESCRIPTION OF THE DRAWINGS

The preferred embodiment of the invention is described herein with reference to the accompanying drawings, in which:

FIG. 1 is a side elevation view of the chock showing it in place on the mounting rail.

FIGS. 2 and 3 are top and bottom plan views, respectively, of the chock.

DETAILED DESCRIPTION OF ILLUSTRATED EMBODIMENT

Figure 3:
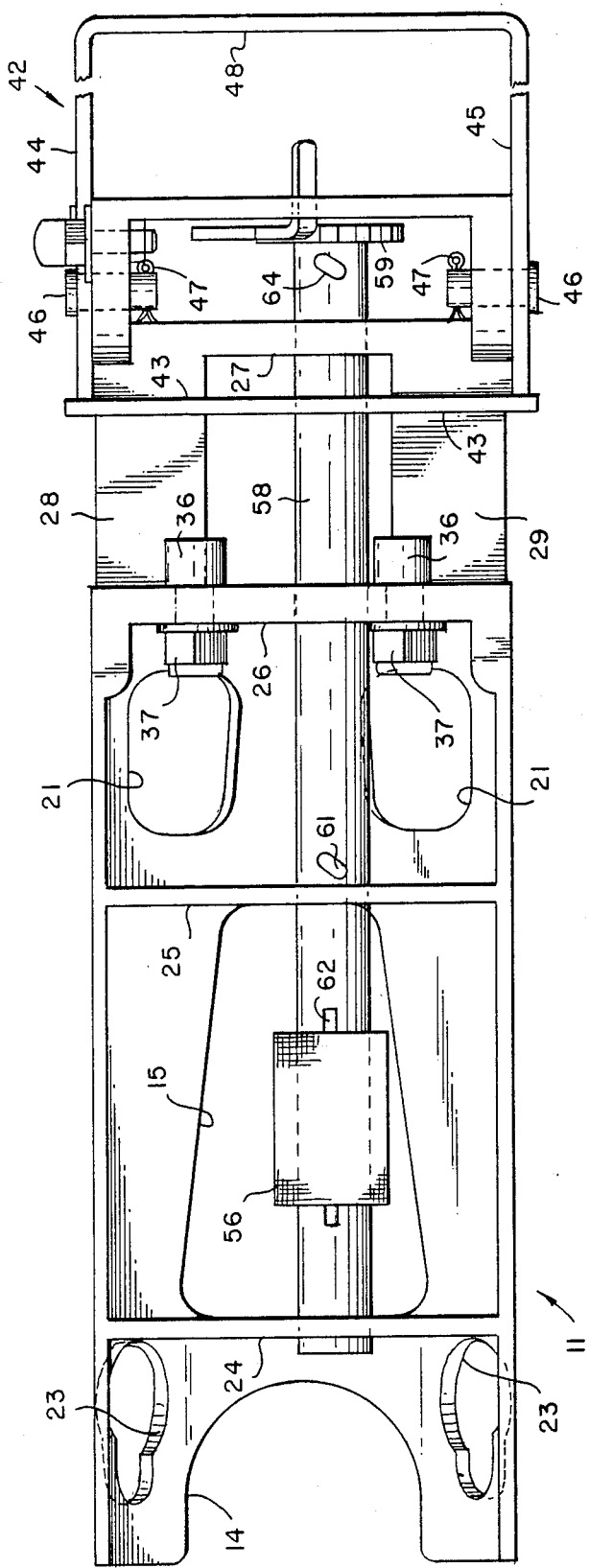

Referring to FIGS. 1-4, the main component of the new chock is a monolithic body 11, which may be an aluminum casting but preferably is a synthetic plastic molding made from a material possessing good impact strength over the range of temperatures encountered by railroads. Suitable plastics are XENOY DX 5720 marketed by General Electric Company, and NYRIM 1000 marketed by DSM RIM Nylon, Inc. Body 11 has an open bottom, and a top defined by a central ridge wall 12 including a domed portion, 12a adjoining transverse wall 13 at the outboard end of the body, a portion 12b located at the opposite end of the body and containing an opening 14, and an intermediate portion 12c which is taken up almost entirely by a large window opening 15. The ridge wall is flanked by a pair of side walls, each of which comprises a wheel-engaging surface 16 or 17 which slopes downward at an angle of about 55°-60° with respect to the horizontal and joins a depending surface 18 or 19. Surfaces 16 and 17 may be planar, but, as illustrated, each is curved on a large radius of about 11". Surfaces 18 and 19 are flat, and, except for a small draft angle of 1° required for molding, they are vertical. The side walls are symmetrical about the central, longitudinal vertical plane of body 11, which gives the chock a universal character, i.e., it may be positioned either in front of or behind a vehicle wheel Each of the surfaces 16 and 17 contains a pair of openings 21 and 22 near its outboard end defining hand grips which enable the chock to be easily carried and manipulated by the workmen. Each surface also contains a keyhole shaped opening 23 near its inboard end so that the chock may be hung from a headed pin fastened to the side screen of the railway car. This feature obviates the metal storage boxes previously provide for chock storage.

The side walls of body 11 are connected with each other and with the ridge wall by three transverse webs 24, 25 and 26, each of which extends over the entire cross section of the body at the station at which it is located. Since, as will be related, web 26 carries the locking pins which connect the chock to the mounting rail of the railway car, it is made thicker than the other webs. Body 11 also includes a fourth transverse web 27, this one extending over only the upper portion of the cross section of the body and being joined to web 26 by a pair of horizontal shelf-like webs 28 and 29 running along the side walls.

The chock body is spanned by a transverse recess 31 which opens through vertical side surfaces 18 and 19 and is adapted to receive the standard hat section mounting rail 32 which extends lengthwise of, and is welded to, the deck 33 of the railway car. This recess 31 is bounded at the top by horizontal webs 28 and 29 and at the inboard side by transverse web 26. As depicted in FIG. 1, the bottom of that portion of body 11 extending inboard from recess 31 is elevated a distance X of approximately ⅞" above the bottom of the wall 13. This spacing provides clearance for the inboard flange 34 of rail 32 and also allows the chock to assume a substantially horizontal orientation when deck 33 is crowned, as it sometimes is. It also will be noticed in FIG. 1 that the bottom edges of side wall surfaces 18 and 19 outboard of recess 31 are cut back as shown at 35. This measure provides clearance for the latching member described later.

The chock may be fixed to rail 32 by a pair of cylindrical steel locking pins 36 projecting into recess 31 from web 26. These pins have threaded shanks which pass through bores formed in web 26 and are secured by self-locking nuts 37. The pins contain small cross bores 38 so they can be held by an awl or similar implement while the nuts are tightened. Each of the upright walls 39 of rail 32 contains a longitudinal series of 1" diameter holes 41 located on 1⅛" centers, and locking pins 36 are sized and spaced to fit into alternate holes of this series. Typically, the pins have a diameter of ⅞" and are installed with a center-to-center spacing of 2¾". The pins 36 extend about ⅞" into recess 31, and the width of this recess is selected to afford an unobstructed or free space about 1/16" wider than rail 32 (at maximum tolerance). As a result, the chock may be installed by lowering it onto the rail and then shifting it laterally to engage pins 36 in the holes 41. The height of recess 31 is about 1/16" greater than the maximum permitted height of rail 32, so horizontal webs 28 and 29 are close to, but do not rest on, the rail when the chock is mounted in place. Although the chock may, and in service does, tilt in both the horizontal and vertical planes relatively to the rail, the close fit between rail 32 and recess 31 is selected to insure that the contact between the margins of the recess and the rail limits such movement and insures that one of the pins 26 always remains engaged in its associated hole 41. This guarantees that the chock will be effective to hold the vehicle even if the workers fail to latch it in place on the rail.

For normal usage, the chock includes a latching mechanism which positively prevents withdrawal of either of the pins 36 from hole 41. This mechanism comprises a four-sided frame 42 made from a steel bar of rectanular cross seciton which is bent to U-shape and is welded at its free ends to a similar straight bar 43. The sides 44 and 45 of frame 42 are jounaled on headed pivot pins 46 which pass through openings in body surfaces 18 and 19 and are retained by cotter pins 47; therefore, frame 42 is free to swing in a vertical plane about the outboard end of body 11. In the latching position of frame 42, which is illustrated in FIG. 1, bar 43 is positioned along and close to the outboard upright wall 39 of rail 32. The distance between bar 43 and transverse web 26 is approximately 1/16" greater than the maximum width of rail 32; therefore, lateral movement of the chock is limited sufficiently to preclude withdrawal of pins 36 from holes 41. The latch is released by grasping frame side 48, which serves as a handle, and swinging frame 42 counterclockwise (as viewed in FIG. 1) to a substantially vertical, unlatching position wherein bar 43 is outside recess 31 and in abutment with side wall portions 35. Sufficient clearance to avoid interference between the latch and the outboard flange of rail 32 during this movement is afforded by making bar 43 narrower than the rest of the frame, locating that bar flush with the bottom of the frame, and beveling the top corners of sides 44 and 45, all as shown in FIG. 1.

Frame 42 is retained in latching position by a spring steel keeper or lock 49 bolted to side wall surface 18. Lock 49 is formed with a pocket 51 sized to receive frame side 44 and having a wall 52 which coacts with the upper margin of side 44 to positively hold frame 42 in latching position. The lock includes an integral nose or protruding release portion 53 which may be manually pressed to flex the lock outward about its mounting bolt 54. This action removes wall 52 from the path of travel of frame side 44, thereby permitting the frame to be pivoted toward unlatching position. Lock 49 is so positioned that, in the unlatching position of frame 42, it partially overlaps side 44 and bears against its outer face. With this arrangement, the lock does not positively hold the frame 42 in the unlatching position, but acts merely as a friction grip which retards movement of the frame from that position. As a result, workers may activate the latch simply by pulling handle side 48 down. It also will be observed that lock 49 automatically snaps into locking position to capture side 44 as the frame 42 is pivoted into latching position. These features facilitate proper installation of the chock.

Figure 7:
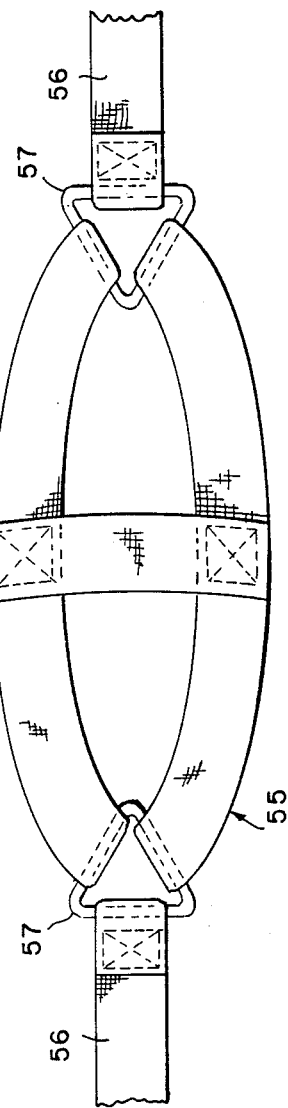
FIG. 7 is a pictorial view of a typical over-the-wheel harness used with a pair of the improved chocks.
Figure 4:
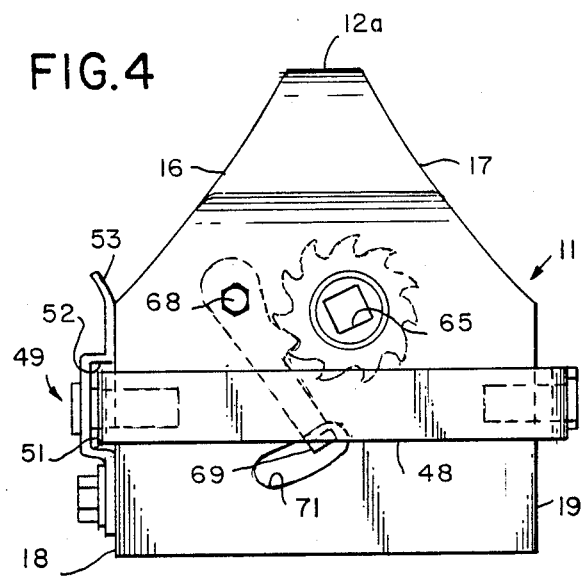
FIG. 4 is an elevation view of the outboard end of the chock.
Figure 5:
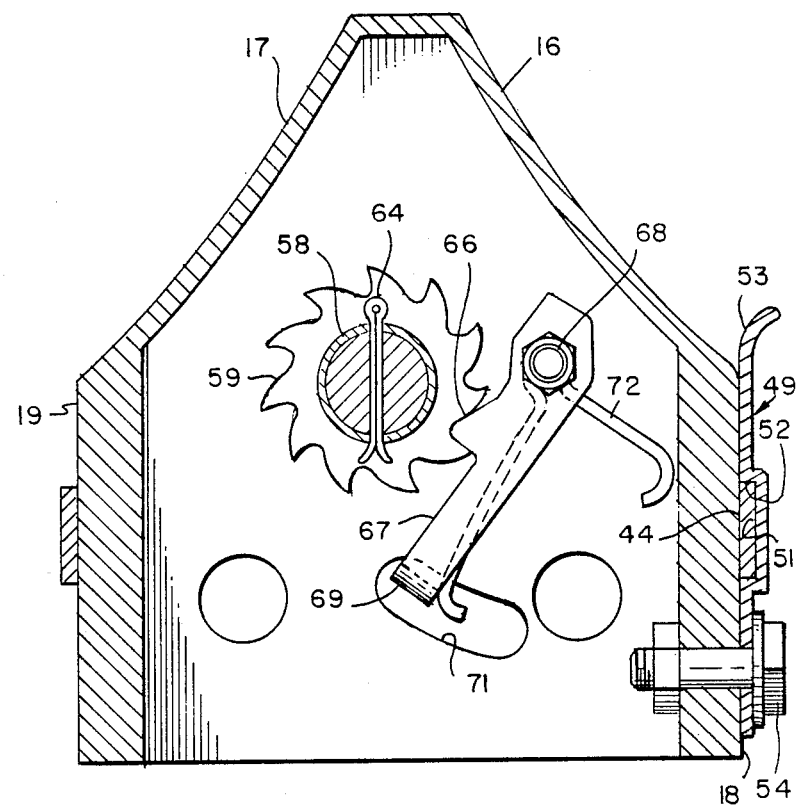
FIGS. 5 and 6 are sectional views taken on lines 5—5 and 6—6, respectively, of FIG. 2, drawn on different scales.
Figure 6:
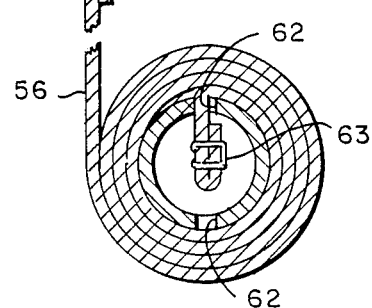

Although the chocks themselves adequately restrain the vehicle during normal impacts, it is considered prudent to provide an over-the-wheel harness to keep the wheel from bouncing over the chock at times when the railway car is subjected to unusually large impacts. A typical commercial harness, depicted in FIG. 7, comprises five strips of nylon webbing, three of which are stitched together to form a central wheel-engaging portion 55, and the remaining two defining end straps 56 which are attached to portion 55 by steel D-rings 57. Both end straps may be permanently attached to the D-rings, or one may be stitched in place and the other provided with a hook (See FIG. 6) which allows removable attachment. In either case, the preferred chock includes mechanism for attaching the free end of a strap 56 and tensioning the harness. That mechanism includes a tubular steel reeling shaft 58 mounted for rotation in aligned bores formed in transverse webs 24-27 and equipped with a ratchet wheel 59 at its outboard end. Ratchet wheel 59, which coacts with end wall 13, and a cotter pin 61, which coacts with transverse web 25, hold shaft 58 against axial displacement. The portion of shaft 58 underlying body window 15 contains a pair of diametrically opposed slots 62 (see FIG. 6) sized to receive strap 56. The strap may be affixed to the shaft by threading its free end through both of the slots 62, folding the end over and attaching it to the main body of the strap, as by a staple 63, and then pulling the strap to draw the folded end into the interior of the shaft. The angle at which strap 56 approaches body 11 is not a constant, but varies with the diameter of the vehicle wheel, and also depends upon whether the chock is positioned fore or aft of the wheel. This angle variation should be taken into account in the design of the chock in order to minimize rubbing of the strap on the margins of window opening 15. In the case of the illustrated chock, which represents a very compact design, the risk of rubbing is reduced by the expedients of locating shaft 58 at a relatively high elevation within body 11, and offsetting the shaft axis slightly (e.g. $\frac{1}{4}$") from the center, longitudinal, vertical plane of the body.

Ratchet wheel 59 has an integral stub shaft which projects into the outboard end of tubular shaft 58 and is held there by cotter pin 64, and an oppositely directed, shorter stub shaft which is journaled in a bore extending through end wall 13. The end of the last mentioned stub shaft is flush with the outer surface of wall 13 and contains a square socket 65 for receiving the $\frac{1}{2}$" drive of a standard ratchet wrench. The ratchet wheel 59 coacts with a pawl 66 formed on a lever 67 pivotally mounted at one end on a bolt 68 fixed in wall 13. At its opposite end, lever 67 is bent to define a release arm 69 which projects from body 11 through an arcuate opening 71 formed in wall 13. A wire spring 72, trained about bolt 68 and formed with curved ends which bear against side wall 18 and arm 69, respectively, biases pawl 66 into engagement with the teeth on wheel 59. With the illustrated arrangement, shaft 58 may be rotated freely in the counterclockwise direction, as viewed in FIG. 4, to reel in strap 56 and tension the harness, but retrograde motion is selectively prevented by the pawl and ratchet mechanism. It will be noticed that the release arm 69 is within the confines of frame 42 and is positioned at approximately the elevation of handle 48 when the frame is in latching position. As a result, the frame, and especially handle 48, serves as a guard which reduces the risk that a careless worker will inadvertently step on arm 69 and either break it or release the pawl.

There are several important reasons for preferring that body 11 be a synthetic plastic molding. First, the chock has a surprisingly light weight. For example, an acceptable version of the illustrated chock, 18" long, $5\frac{1}{4}$" wide and $6\frac{1}{4}$" high and made of XENOY DX5720, weighs only about $5\frac{1}{2}$ pounds, including all metal hardware and an end strap 56. Second, this form of body avoids the built in stresses which can be present in metal chocks, especially in those fabricated by welding. Third, compared to metal chocks, the plastic chock is less likely to cause abrasion damage to vehicle bodies when it is bumped against them as a result of careless handling during vehicle-loading and-unloading operations. In addition, the plastic chock sheds ice more readily, and it causes less wear on the vehicle tires and harness straps which rub against it during service. Finally, any wearing of the chock body generates only relatively inert, nonrusting material particles which will not damage painted vehicle surfaces on which they may deposit.

It should be noted too that the locking pins 36, the reeling shaft 58 and the pawl and ratchet mechanism 59, 67, 72 in the preferred embodiment are located within the confines of, and effectively shielded by, body 11. Therefore, it is unlikely that these hardware components will be fouled by ice or damaged by impact blows.

The improved chocks are used in sets, each consisting of a pair of chocks and an over-the-wheel harness. These parts may be stored easily simply by hanging the chocks from pins mounted in the side screen of the car, as indicated earlier. If the harness has permanently attached end straps 56, it will hang freely between the chocks. On the other hand, if one of the straps has a hook connector, that strap will hang from one chock, and the rest of the harness will hang from the other chock.

Installation of the chocks is a simple procedure. The chocks of one set are placed on mounting rail 32 in positions in front of and behind a vehicle wheel, with the harness draped over the wheel, shifted toward the wheel as far as possible, and then moved laterally to effect engagement of locking pins 36 in rail holes 41. Next, each chock is secured in place by swinging frame 42 downward to the horizontal, latching position. Once the chocks are secured, and the end strap 56, if removable, is attached to the rest of the harness, the worker inserts the drive of a wrench in socket 65 and rotates the reeling shafts 58 as needed to locate D-rings 57 in positions in which they are least likely to contact vehicle body parts during transit. Finally, the harness is drawn snug on the wheel by further rotation of one or both of the reeling shafts. The other wheel on the same side of the vehicle is restrained in the same way, using a second set of components. All of these manipulations may be performed from the outboard side of rail 32 and without requiring the worker to reach beneath the vehicle. Therefore, the installation process is inherently safe.

Motor vehicles are loaded rapidly onto railway cars, and their positions are not precisely controlled. Therefore, the side walls of the tires may be tight against rail 32 or spaced from the rail by a variable distance Moreover, the vehicles may shift laterally on deck 33 during transit. Because of this, end straps 56 may be initially, or later become, tilted out of a transverse plane normal to the axis of shaft 58. If the strap initially is wound neatly on the shaft, sometimes the turns will slide relatively to each other during transit as a result of this tilting, and the harness will become slack. It has been found that this condition can be eliminated by winding the strap initially with offset or overlapping turns.

Dismounting of the chocks also is a quick, easy and safe task. First, a worker uses one hand to hold pawl release arm 69 in release position while he pulls on strap 56 with his other hand. This action unwinds a portion of the strap from shaft 58 and slackens the harness. Next, the worker uses his two hands to release lock 49 and swing frame 42 upward to unlatching position. Then, using the grips provided by body openings 21 and 22, he shifts the chock laterally to disengage pins 36 from holes 41, and lifts the chock from rail 32. Finally, the workmen unlatches and removes the other chock of the set, and pulls the harness from the wheel.

Although the foregoing description emphasizes use of the chock on railway transporters, it should be evident that the disclosed restraint scheme may be employed on over-the-highway, truck type transporters. Furthermore, the improved chock may also be utilized on marine transporters. In this application of the invention, however, permanent mounting rails are not practical because they would interfere with the process of driving the vehicles around on the ship's deck during loading and unloading. Therefore, here it is recommended that each chock be provided with a releasable mount, such as a short section of rail 32 adapted for removable attachment to the ship's deck.

We claim:

1. A wheel chock for use on a motor vehicle transporter for releasable attachment to an elongated restraining element affixed to the transporter and having a pair of upright walls, at least one of which contains a longitudinal series of uniformly spaced and sized holes, the chock comprising
   a. an elongated, monolithic body formed with a central ridge wall flanked by a pair of downward sloping, wheel-engaging side wall portions arranged symmetrically with respect to the ridge wall, and with a transverse, open bottom recess adapted to receive the restraining element and bounded at one side by a transverse web; and
   b. a pair of locking pins fixed to the body, projecting into the transverse recess from the transverse web, and being arranged to engage in alternate holes in the restraining element,
   c. the recess containing an unobstructed space beyond the ends of the pins slightly wider than the restraining element, whereby the body may be placed on that element from above and then shifted in the direction of its length to bring the pins into engagement with said holes, and
   d. the body being tiltable in both horizontal and vertical planes with respect to the restraining element when the pins are engaged in said openings, but the magnitude of such tilting being limited by the margins of the recess so that at least one of the pins always remains engaged in its associated hole.

2. A wheel chock as defined in claim 1 including a manually operated latching member mounted on the body for movement between
   a. a latching position, in which it coacts with the transverse web to limit shifting movement of the body in its longitudinal direction and prevent withdrawal of the pins from their associated holes, and
   b. an unlatching position, in which such withdrawal of the pins is permitted.

3. A wheel chock as defined in claim 2 including a manually releasable lock carried by the body and effective automatically upon movement of the latching member to latching position to positively hold the member in that position.

4. A wheel chock as defined in claim 3 in which the latching member comprises a four-sided frame,
   a. two opposite sides of the frame being pivotally attached to opposite sides of the body,
   b. a third side of the frame serving as a handle and being free to swing about one end of the body, and
   c. the fourth side of the frame serving as a latch,
   d. the frame being disposed horizontally with the fourth side inside said recess and extending along one upright wall of the restraining element in said latching position, and being disposed substantially vertically with the fourth side outside the recess in unlatching position.

5. A wheel chock as defined in claim 4 wherein the manually releasable lock is located on one side of the body and coacts with one of said pivotally attached sides of the frame.

6. A wheel chock as defined in claim 1 including
   a. a reeling shaft mounted for rotational movement in and extending longitudinally of the body;
   b. a window opening through the ridge wall of the body overlying a portion of the shaft;
   c. a ratchet wheel connected to rotate with the shaft and a cooperating pawl pivotally mounted on the body and spring biased into engagement with the ratchet wheel; and
   d. a manually operated pawl release element accessible at one end of the body.

7. A wheel chock as defined in claim 6 in which the ratchet wheel and pawl are located inside the body; and the pawl release element protrudes through an end wall of the body.

8. A wheel chock as defined in claim 7 including
   a. a manually operated latching member mounted on the body for pivotal movement between a latching position, in which it coacts with the transverse web to limit shifting movement of the body in its longitudinal direction and prevent withdrawal of the pins from their associated holes, and an unlatching position, in which such withdrawal of the pins is permitted,
   b. the latching member comprising a handle which is free to swing about one end of the body and which, in the latching position lies adjacent the pawl release element and acts as a guard which reduces the risk of physical damage to and unintended actuation of that element.

9. A wheel chock as defined in claim 6 in which the reeling shaft is located eccentrically relative to a longitudinal, vertical plane passing through the center of the body.

10. A wheel chock for use on a motor vehicle transporter for releasable attachment to an elongated restraining element affixed to the transporter and having a pair of upright walls, at least one of which contains a longitudinal series of uniformly spaced and sized holes, the chock comprising
   a. an elongated body formed with a transverse, open bottom recess for receiving the restraining element and being bounded at one side by a transverse wall;
   b. a pair of locking pins carried by the body, projecting into the recess from the transverse wall, and being arranged to engage in alternate holes in the restraining element;
   c. a transverse latching member mounted for pivotal movement on the body at the side of the recess opposite the transverse wall so it may be swung into and out of the recess when the body is on the restraining element and the pins are engaged in holes in that element,
   d. the latching member having a latching position, in which it is disposed in the recess along one of the upright walls of the restraining element and coacts with the transverse body wall to limit movement of the body in its longitudinal direction and prevent withdrawal of the pins from their associated holes; and
   e. a manually releasable locking means for selectively holding the latching member in latching position.

11. A wheel chock as defined in claim 10 wherein the latching member is defined by one side of a four-sided frame, the adjacent sides of which are pivotally attached to the body and the opposite side of which is free to swing around one end of the body, the frame being disposed horizontally when in latching position and being movable therefrom to a substantially vertical, unlatching position.

12. A wheel chock as defined in claim 11 wherein the latching and unlatching positions are defined by the locking means and a portion of the body, respectively.

13. A wheel chock as defined in claim 11 wherein the locking means comprises
   a. a shiftable keeper member carried by the body and movable transversely of the path of travel of one of said adjacent frame sides between obstructing and nonobstructing positions;
   b. spring means biasing the keeper member toward obstructing position,
   c. the keeper member and said one adjacent frame side having a set of cooperating portions which coact to positively hold the frame in latching position; and
   d. an exposed release member through which the keeper member may be shifted manually to nonobstructing position to permit pivoting of the frame from latching position.

14. A wheel chock as defined in claim 13 in which the locking means is defined by a single spring strip formed to provide said keeper and release members, the spring strip being affixed to the body in cantilever fashion so that it flexes when the keeper member is shifted to non-obstructing position.

15. A wheel chock as defined in claim 14 in which the spring strip overlaps said one adjacent frame side in the unlatching position of the frame, and automatically snaps the keeper member into obstructing position as the frame moves into latching position.

16. A wheel chock for use on a motor vehicle transporter for releasable attachment to an elongated restraining element affixed to the transporter and having a pair of upright walls, at least one of which contains a longitudinal series of uniformly spaced and sized holes, the chock comprising a monolithic, elongated, open bottom body having
   a. a transverse wall across one end;
   b. a central ridge wall extending longitudinally along the top of the body and including a first wall portion adjacent the transverse wall, a second wall portion adjacent the opposite end, and an intermediate third wall portion which encompasses an elongated window opening;
   c. a pair of side walls comprising symmetrical, sloping wheel-engaging surfaces which extend outward and downward from the ridge wall and each of which joins a depending, substantially vertical surface;
   d. four transverse webs interconnecting the side and ridge walls, one web being located at each end of the third ridge wall portion and the other two webs being located intermediate the ends of the first ridge wall portion; and
   e. a pair of aligned openings extending through the vertical surfaces of the side walls and sized to receive the restraining element, these openings being located between said other two transverse webs.

17. A wheel chock as defined in claim 16 in which the first ridge wall portion is domed.

18. A wheel chock as defined in claim 17 including a key hole-shaped opening through the sloping surface of each side wall in the region of the second ridge wall portion.

19. A wheel chock as defined in claim 18 including a pair of hand grip openings extending through the sloping surface of each side wall in the region of the first ridge wall portion and each being located between a pair of transverse webs.

20. A wheel chock as defined in claim 16 in which each wheel-engaging surface slopes downward at an angle of 55°-60° with respect to the horizontal.

21. A wheel chock as defined in claim 16 in which the body is an aluminum casting.

22. A wheel chock as defined in claim 16 in which the body is a synthetic plastic molding.

23. A wheel chock as defined in claim 16 including aligned shaft-receiving openings extending through the transverse wall and the transverse webs, the centers of these openings being offset from the central longitudinal, vertical plane of the body.

* * * * *

Notice of Adverse Decisions in Interference

In Interference No. 102,412 involving Patent No. 4,875,813, D. L. Moyer, T. O. Allred, WHEEL CHOCK, final judgment adverse to the patentees was rendered Oct. 16, 1991, as to claims 4, 5, 8, 10 and 11-15.

*(Official Gazette December 24, 1991).*